Patented June 5, 1923.

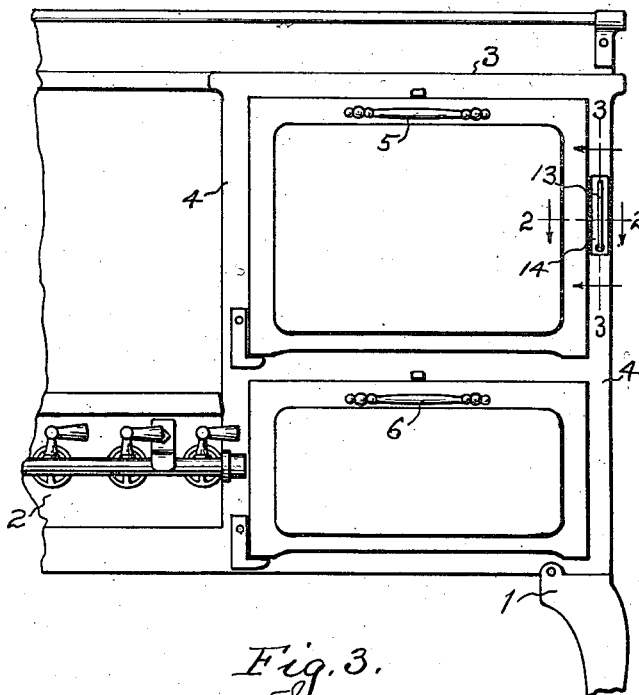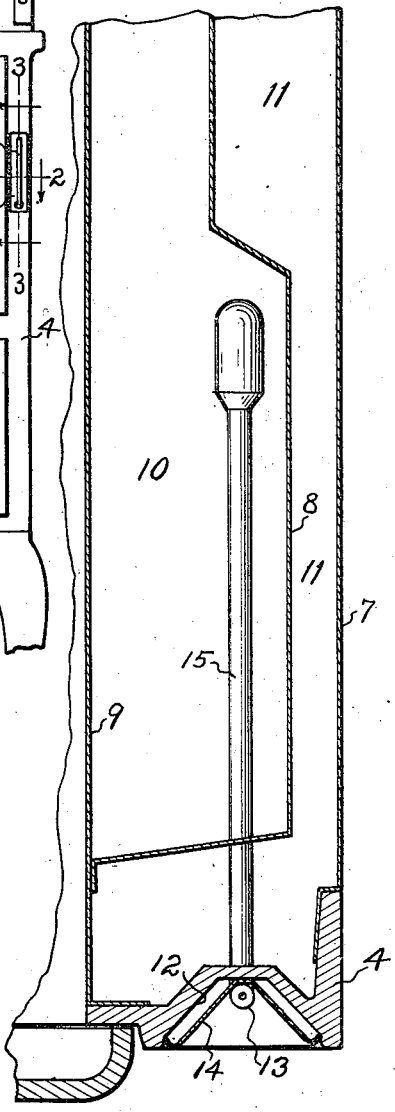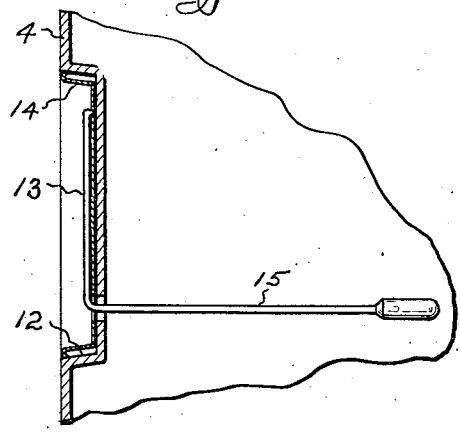

1,457,335

UNITED STATES PATENT OFFICE.

GEORGE D. WILKINSON, OF OAK PARK, ILLINOIS, ASSIGNOR TO CRIBBEN & SEXTON COMPANY, OF CHICAGO, ILLINOIS, A CORPORATION OF ILLINOIS.

OVEN THERMOMETER.

Application filed August 15, 1921. Serial No. 492,233.

*To all whom it may concern:*

Be it known that I, GEORGE D. WILKINSON, a citizen of the United States, residing at Oak Park, in the county of Cook, State of Illinois, having invented certain new and useful Improvements in Oven Thermometers, do hereby declare that the following is a full, clear, and exact description of the same.

My invention relates to devices for indicating the temperatures of ovens in cooking stoves or ranges, and consists in the novel and useful constructions herein described and then pointed out in the appended claims.

In the accompanying drawings, which illustrate a practical embodiment of my present invention and in which the same reference numerals indicate similar parts in the different figures, Fig. 1 is a view in front elevation of a gas stove with part of the open-top broken away and the oven door jamb of the front frame provided with a thermometer for ascertaining the temperatures in the oven heated by an oven-burner of any suitable form or type;

Fig. 2 is a detail sectional view on the line 2—2 of Fig. 1 on an enlarged scale, and Fig. 3 is a detail view on the line 3—3 of Fig. 1.

As shown the reference numeral 1 indicates the frame of the gas-range or stove, 2 the open-top cooking section, and 3 the oven section arranged at one side of the open-top and having an upper baking oven and a lower broiling and toasting oven separated from each other by the usual sheet-metal partition. Below the partition the oven burner is suitably arranged and supported, and is connected to the gas-manifold of the burner-box of the top cooking section in any suitable manner now well-known in the art. The front-frame or door jamb 4 of the oven-section, to which the doors 5 and 6 of the upper and lower ovens are suitably pivoted, is attached to the sides 7 of the oven section in any suitable manner, and the oven is provided at each side with a lining 8 and a rack-plate 9 having the usual guides or ways and forming the heat-circulating flues 10 and dead-air spaces or chambers 11. The flues are in effect part of the interior of the oven and provide for circulation of the products of combustion of the oven-burner, and the dead-air chambers prevent radiation and loss of heat.

One of the upright members of the door-jamb is provided on its front face with a countersunk seat 12 in which is located a thermometer 13 of either the liquid or metallic type with its liquid chamber or thermal element, as the case may be, extended rearwardly through the jamb and entering the corresponding heat-flue forming part of the oven area. In the form shown the instrument is a mercurial thermometer having its dial or indicating leg carried on a frame 14 and its heat-responding leg 15 carrying the mercury bulb bent at a right angle thereto and passing through the jamb into the heat-flue 10 of the oven. By this arrangement the thermometer is located at a point where its indications are in plain view, while it is set into the stove-frame so that it does not project above the frame or beyond the line of its front face and is protected against injury and breakage. Also, the heat-responding leg in the flue-space is protected by the rack-plate 9 against injury by pans when the latter are placed in the oven. It is conveniently located, easily read and out of the way, while it indicates the temperatures of the oven so that the burner may be regulated to afford the desired degree of heat in the oven for cooking different articles of food. Its location on the jamb enables it to extend back into the cooking area and so give the temperatures at that point, and to be used on either low-down stoves or cabinet ranges.

I claim:

1. A stove having an oven, a front frame for the oven having a countersunk seat, and a thermometer mounted in the seat of the front-frame and having its heat-responding leg extending through said frame and located in the oven.

2. A stove having an oven provided with lateral heat-flues, a front-frame for the oven having a countersunk seat, and a thermometer mounted in the seat of the front-frame and having its heat-responding leg extending through said frame into the oven.

3. A stove having an oven provided with lateral heat flues, a front-frame on the oven, one of the vertical members of the frame having a countersunk seat in its front face, and a thermometer located in said seat and having its heat-responding leg extending rearwardly through the frame into one of the heat flues.

In testimony whereof I affix my signature.

GEO. D. WILKINSON.